(No Model.)
G. H. MARSH.
FEED ROLL.
No. 477,428. Patented June 21, 1892.
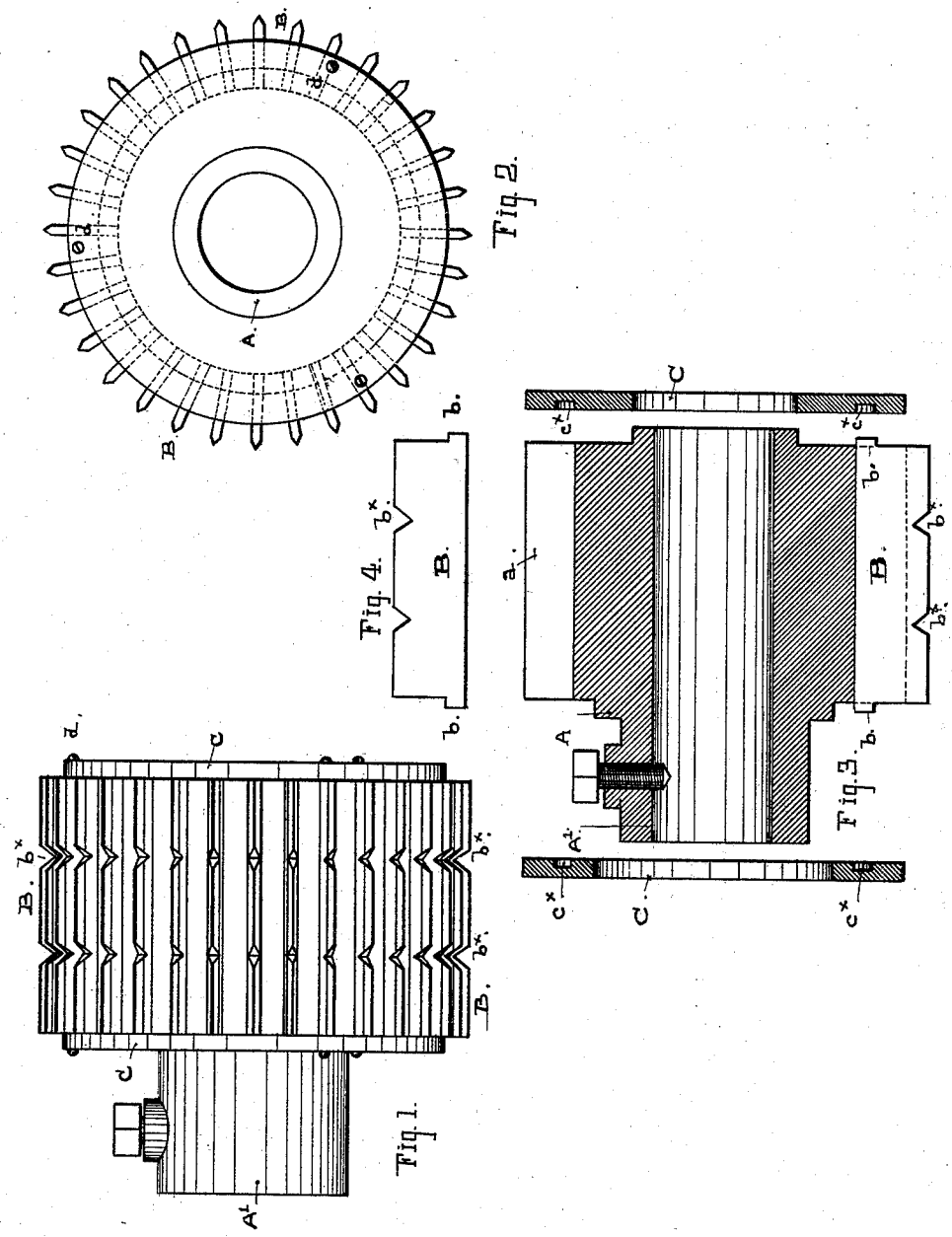
Witnesses:
Inventor:
George H. Marsh

United States Patent Office.

GEORGE HENRY MARSH, OF SAN FRANCISCO, CALIFORNIA.

FEED-ROLL.

SPECIFICATION forming part of Letters Patent No. 477,428, dated June 21, 1892.

Application filed April 17, 1891. Serial No. 389,293. (No model.)

*To all whom it may concern:*

Be it known that I, GEORGE HENRY MARSH, a citizen of the United States, residing in the city and county of San Francisco, State of California, have invented certain new and useful Improvements in Feed-Rolls, of which the following is a specification.

My invention relates to feed-rolls for "stickers" or molding-machines, planing-machines, and other wood-working machinery, and especially to feed-rolls of the class or description in which the teeth are formed of separate removable plates.

The improvements constituting this invention consist of a novel construction and combination of body and clamping rings or collars and teeth-plates. Also a novel form of tooth having V-shaped notches alternating with plain or straight edge portions.

The object of these improvements is mainly to secure a firm and solid set of the teeth in the body and ready loosening of the parts to remove any one of the teeth-plates for repairs, and with respect to the form of the tooth itself to afford better or improved biting and holding quality upon the work, particularly upon the irregular surfaces of moldings.

The following is a description of my improved feed-roll and the manner in which I construct it, the accompanying drawings forming part of this specification being referred to by letters.

Figure 1 represents a feed-roll for a sticking or molding machine constructed according to my invention. Fig. 2 is an end view of Fig. 1, looking from the right. Fig. 3 is a central longitudinal section of the parts in detail. Fig. 4 is a view of one of the teeth-plates.

A indicates the body of the roll; A', a hub or part to slip over the shaft and fix the body in position for work, and B B are the teeth-plates.

C C are rings or collars set closely against the ends of the body and held by screws.

In the body are longitudinal slots or deep grooves extending parallel with the axis and at equal distances apart all round the circumference, the number of which correspond with the number of teeth-plates in the roll. The teeth-plates are set into these grooves in the body for about one-half the depth of the plates and the body, or that portion of the tooth-plate confined in the groove, has the same shape as the groove to slip into it from one end of the roll. The projecting portion of each tooth-plate, which I term the "working part" of the plate, has the same length as the body A, and the rings or the collars C set closely against the end of the roll; but the base or lower portion of the tooth-plate in the groove projects beyond the roll at both ends, as shown at *b*. This nib or projection is shaped to fit into a groove in the inner face of the ring C, and therefore the whole set or number of teeth-plates are held tightly in place by the two rings when those parts are drawn up against the ends of the body by the screws. To remove any one or several of the teeth one of the rings is removed from the end of the body and the tooth-plate is slipped out of its groove by driving it out from the opposite end. In this operation it is not necessary to loosen the other ring, and the remaining teeth-plates are not disturbed in any way.

New teeth-plates are quickly and accurately adjusted in the body without special skill or care on the part of the workman and without consuming much time, as the inserted tooth must necessarily be in position and must have the proper amount of projection from the periphery of the body when the collar C is set in place and drawn up against the end of the body.

In constructing the teeth for my improved feed-roll, I divide the edge or acting part of the tooth-plate by V-shaped notches $b^\times$ into separate sections of about equal length, each section or portion having a sharp corner on both ends which is formed by cutting the aforesaid V-shaped notches. The result of this construction is to give a better or more certain biting and holding action of the acting part of the tooth than is obtained by a straight or continuous edge, and particularly to secure a firm hold without slip upon molded surfaces and inclined or uneven faces of the pieces being run through the machine. I have found in practice that an acting edge of this form possesses excellent gripping qualities and will act well when in use for a considerable length of time even when it is worn down.

Having thus fully described my invention, what I claim, and desire to secure by Letters Patent, is—

1. The herein-described feed-roll for wood-working machines, comprising the body A, having slots or grooves extending from end to end and radially around the circumference toward the axis, the inserted removable teeth-plates B in said grooves having nibs or projections $b$ on the ends, which project beyond the ends of the body, and the rings C, having grooves in their inner faces, which take the said projections of the teeth-plates, and the screws taking through said rings into the body as a means of securing the rings in place, substantially as set forth.

2. The combination, with the body A, of an insertible tooth-plate having a projecting acting portion or edge with alternate smooth or plain sections, and V-shaped notches $b^\times$, which are arranged, as described, to produce separated acting edges with sharp corners on each tooth, as set forth.

In testimony that I claim the foregoing I have hereunto set my hand and seal.

GEO. HENRY MARSH. [L. S.]

Witnesses:
C. W. M. SMITH,
OTIS V. SAWYER.